(12) United States Patent
Moore

(10) Patent No.: US 12,171,354 B2
(45) Date of Patent: Dec. 24, 2024

(54) REMOVABLE FOOTWEAR ACCESSORY FOR FOOT AND ANKLE SUPPORT WHILE DRIVING

(71) Applicant: Diane Moore, Suwanee, GA (US)

(72) Inventor: Diane Moore, Suwanee, GA (US)

( * ) Notice: Subject to any disclaimer, the term of this patent is extended or adjusted under 35 U.S.C. 154(b) by 0 days.

(21) Appl. No.: 17/890,321

(22) Filed: Aug. 18, 2022

(65) Prior Publication Data

US 2023/0055846 A1   Feb. 23, 2023

Related U.S. Application Data

(60) Provisional application No. 63/234,842, filed on Aug. 19, 2021.

(51) Int. Cl.
*A47G 25/80* (2006.01)
*A43B 21/44* (2006.01)
*A43B 23/30* (2006.01)

(52) U.S. Cl.
CPC ............. *A47G 25/80* (2013.01); *A43B 21/44* (2013.01); *A43B 23/30* (2013.01)

(58) Field of Classification Search
CPC ......... A43B 5/007; A43B 21/36; A43B 21/44; A43B 21/45; A43B 21/47; A43B 21/48; A43B 23/30; A43C 15/04; A43C 15/066
See application file for complete search history.

(56) References Cited

U.S. PATENT DOCUMENTS

| | | |
|---|---|---|
| 1,291,657 A | 1/1919 | Nolan |
| 1,359,805 A | 11/1920 | Hollingsworth |
| 1,551,345 A | 8/1925 | Thomasian |
| 2,466,611 A | 4/1949 | Nicoletti |
| 2,556,842 A | 6/1951 | Gilmour |
| 3,188,755 A | 6/1965 | Cortina |
| 3,574,959 A * | 4/1971 | Cicero .................... A43C 13/12 36/135 |
| 4,062,132 A | 12/1977 | Klimaszewski |
| 4,768,296 A * | 9/1988 | Gibbs .................... A43B 23/30 36/72 B |
| 5,596,819 A | 1/1997 | Goldston et al. |
| (Continued) | | |

FOREIGN PATENT DOCUMENTS

| | | |
|---|---|---|
| CA | 2159427 A1 | 3/1997 |
| CN | 202160756 U | 3/2012 |
| (Continued) | | |

OTHER PUBLICATIONS

International Search Report and Written Opinion dated Dec. 8, 2022 cited in Application No. PCT/US22/40701, 8 pgs.
(Continued)

*Primary Examiner* — F Griffin Hall
(74) *Attorney, Agent, or Firm* — BEKIARES ELIEZER LLP

(57) ABSTRACT

A removable footwear device is provided to support a foot and ankle of a user. The device includes a footwear retaining mechanism configured to releasably retain a heel portion of a footwear article, while not retaining an arch portion and a toe portion of the footwear article. The device also includes a support base configured to support the foot and ankle, and to raise the foot to a position for operating a motor vehicle. The footwear retaining mechanism is mounted to the support base.

20 Claims, 10 Drawing Sheets

(56) References Cited

U.S. PATENT DOCUMENTS

| | | | |
|---|---|---|---|
| 5,692,322 | A | 12/1997 | Lombardino |
| 9,220,970 | B1 | 12/2015 | Kavarsky, Jr. et al. |
| 11,338,192 | B2* | 5/2022 | Ibach .................. A63C 9/08571 |
| 11,751,638 | B2* | 9/2023 | Dente ....................... A43B 1/10 |
| | | | 36/62 |
| 2004/0237345 | A1 | 12/2004 | Meschan |
| 2005/0262730 | A1 | 12/2005 | Meschan |
| 2010/0101113 | A1 | 4/2010 | Paik |
| 2013/0333249 | A1 | 12/2013 | Guer |
| 2016/0331080 | A1 | 11/2016 | Weaver |
| 2022/0079294 | A1* | 3/2022 | Bock ........................ A43C 1/00 |

FOREIGN PATENT DOCUMENTS

| | | |
|---|---|---|
| CN | 202566573 U | 12/2012 |
| CN | 202635795 U | 1/2013 |
| CN | 204838247 U | 12/2015 |
| CN | 212590651 U | 2/2021 |
| CN | 213154361 U | 5/2021 |
| FR | 469253 A | 7/1914 |
| WO | 9613995 A1 | 5/1996 |

OTHER PUBLICATIONS

Foot Controls—Vehicle Adaptations—Mobility Innovators, https://www.mobilityinnovators.com/products/driving-aids/foot-controls/, 5 pgs. (Retrieved: Aug. 17, 2022).

Heel Shelf for Pedal Extensions Archives | Eureka Solutions, https://eurekasolution.com/en/produits/heel-shelf-for-pedal-extensions/, 3 pgs. (Retrieved: Aug. 17, 2022).

* cited by examiner

REMOVABLE FOOTWEAR ACCESSORY FOR FOOT AND ANKLE SUPPORT WHILE DRIVING

RELATED APPLICATION

The present application claims benefit under the provisions of 35 U.S.C. § 119(e) of U.S. Provisional Application No. 63/234,842 filed on Aug. 19, 2021, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to foot and ankle support devices, and particularly to removable footwear accessories for foot and ankle support while driving.

BACKGROUND

Driving a vehicle, such as a car, truck, tractor, or other farm vehicle can cause the driver to sit in an unnatural position, and may require the driver to support the foot and ankle of their "driving foot" (typically the right foot and ankle in the United States) using leg muscles. Over long periods of time, the posture required for driving can cause irritation in leg joints (e.g., the ankle, knee, and/or hip) and/or back pain in drivers. This problem can be exacerbated when the driver is of shorter or smaller stature, and particularly when diving commercial vehicles, such as transport trucks, where the pedals are typically large and relatively high from a floor of the truck.

Moreover, when a driver rests their heel on the vehicle floor for an extended period of time while driving, the heel portion of the driver's footwear may deteriorate. This can cause uneven wear of the footwear, which can lead to additional physical strain on the driver and/or added expense for replacing footwear.

Accordingly, there is a need for a foot support that elevates a user's foot, placing it in a natural position for operating the pedals of a vehicle, while still allowing the user to maintain contact with the vehicle floor.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

An adjustable-width footwear accessory to provide additional support and cushioning for a user's ankle during seated activities, such as driving, is provided. The accessory may be removably and releasably attached to at least a portion (e.g., a heel portion) of a footwear article (e.g., a work boot or shoe) worn by the user. The accessory may support a heel portion of the user's foot, raising the user's foot to assist in working pedals of a vehicle, such as a work truck. The accessory may leave portions of the outsole corresponding to the midfoot (e.g., arch or tarsal bones), and the forefoot (e.g., the metatarsal bones, and phalanges) unobstructed, such that the user may drive the vehicle.

To use the accessory, a user in a seated position may position a heel portion of a footwear article in the footwear accessory. The use may attach the accessory to the user's footwear article by, for example, actuating a lever on the top surface of the accessory by providing downward force on the lever with their foot. The accessory may tighten around the user's foot, releasably retaining the footwear article via a friction fit. The accessory can releasably and removably retain the foot during time spent driving. To remove the accessory (e.g., upon completion of driving or when a user wishes to stand or walk), the user may trigger a release mechanism, allowing the user to remove the accessory from the footwear article.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
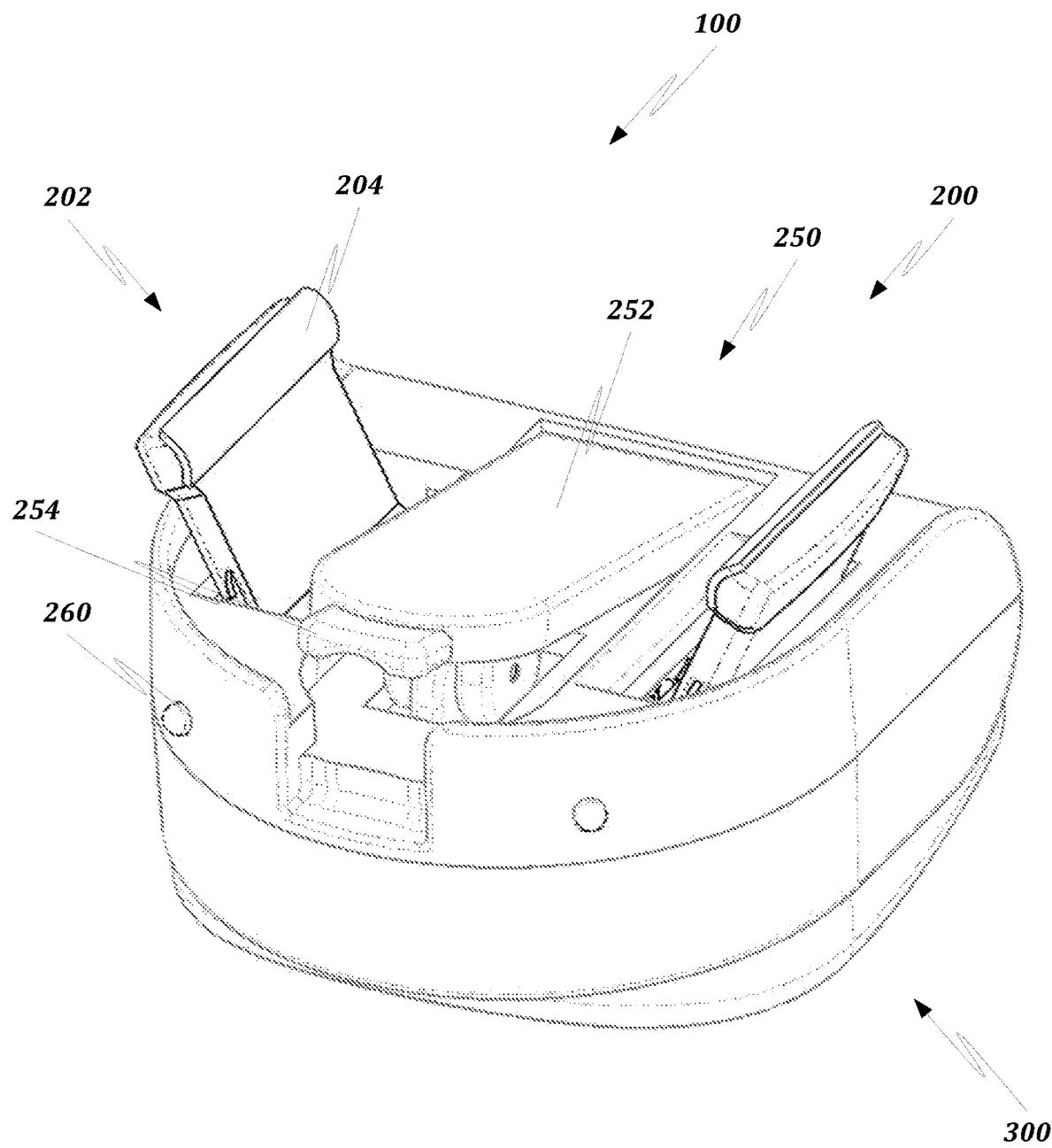
FIG. 1 is a perspective view of a removable footwear accessory for foot and ankle support, in an open position.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

The present disclosure can be understood more readily by reference to the following detailed description of the disclosure and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Any and all publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an assembly" includes two or more assemblies.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the components to be used to manufacture the disclosed devices and articles of the disclosure as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the disclosure. Thus, if there are a variety of additional steps that can be performed it is understood that each of these additional steps can be performed with any specific aspect or combination of aspects of the methods of the disclosure.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

The present disclosure includes many aspects and features. Moreover, while many aspects and features relate to, and are described in, the context of a footwear accessory to relieve stress caused by extended periods of driving, embodiments of the present disclosure are not limited to use only in this context.

I. Apparatus Overview

This overview is provided to introduce a selection of concepts in a simplified form that are further described below. This overview is not intended to identify key features or essential features of the claimed subject matter. Nor is this overview intended to be used to limit the claimed subject matter's scope.

An adjustable-width footwear accessory to provide additional support and cushioning for a user's ankle during seated activities, such as driving, is provided. The accessory may be removably and releasably attached to a heel portion of a footwear article (e.g., a work boot or shoe) worn by the user. The accessory may support a heel portion of the user's foot, raising the user's foot to assist in working pedals of a vehicle, such as a work truck. The accessory may leave portions of the outsole corresponding to the midfoot (e.g., arch or tarsal bones), and the forefoot (e.g., the metatarsal bones, and phalanges) unobstructed, such that the user may drive the vehicle.

To use the accessory, a user in a seated position may position a heel portion of a footwear article in the footwear accessory. The use may adjust the width of the accessory by, for example, pressing downward on the accessory with the user's foot. The foot may actuate a lever that causes the accessory to tighten around the user's foot and lock in place, releasably retaining the footwear article via a friction fit. The accessory can releasably and removably retain the foot during time spent driving. To remove the accessory (e.g., upon completion of driving or when a user wishes to stand or walk), the user may trigger a release mechanism, allowing the user to remove the accessory from the shoe.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Footwear Accessory Configuration

Figure 2:
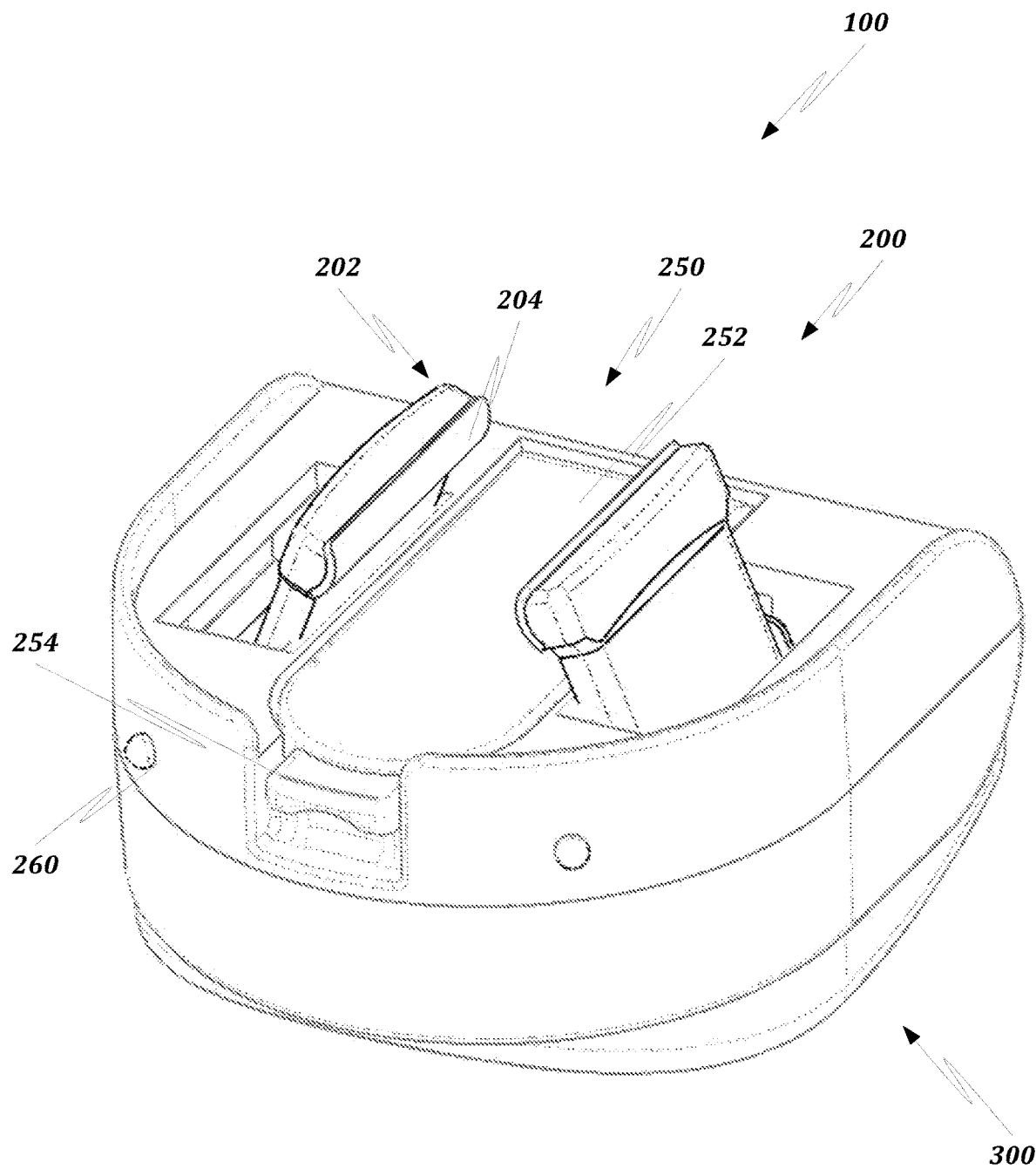
FIG. 2 is a perspective view of the removable footwear accessory of FIG. 1, in a closed position.

FIGS. 1 and 2 illustrate a removable footwear accessory 100 comprised of a set of components, including, but not limited to an adjustable width footwear retaining device 200 and a base 300 to which the retaining device may be mounted.

A. The Adjustable Width Footwear Retaining Device

Figure 3:
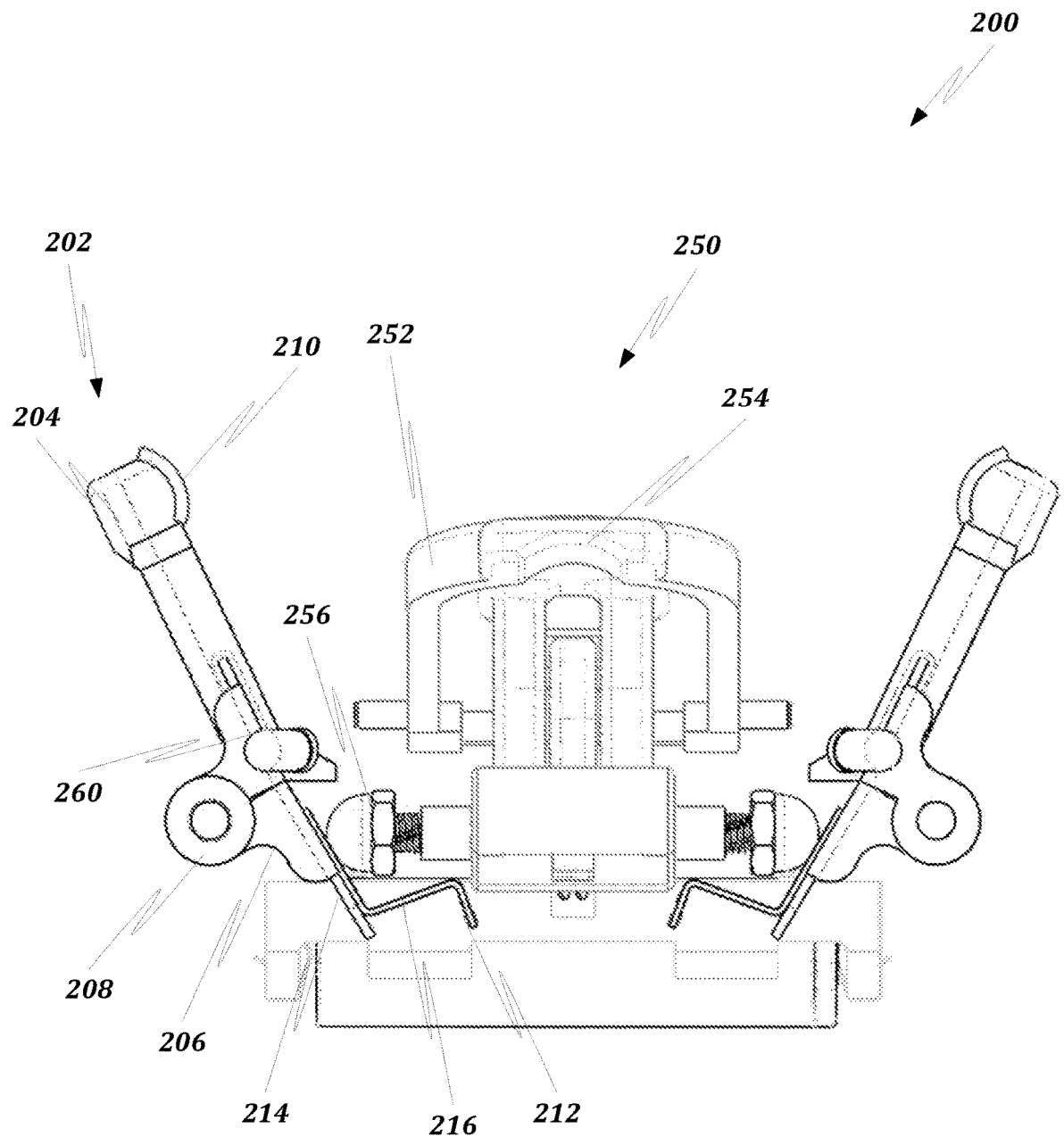
FIG. 3 shows a retaining mechanism of the footwear accessory of FIGS. 1 and 2, in an open position.
Figure 4:
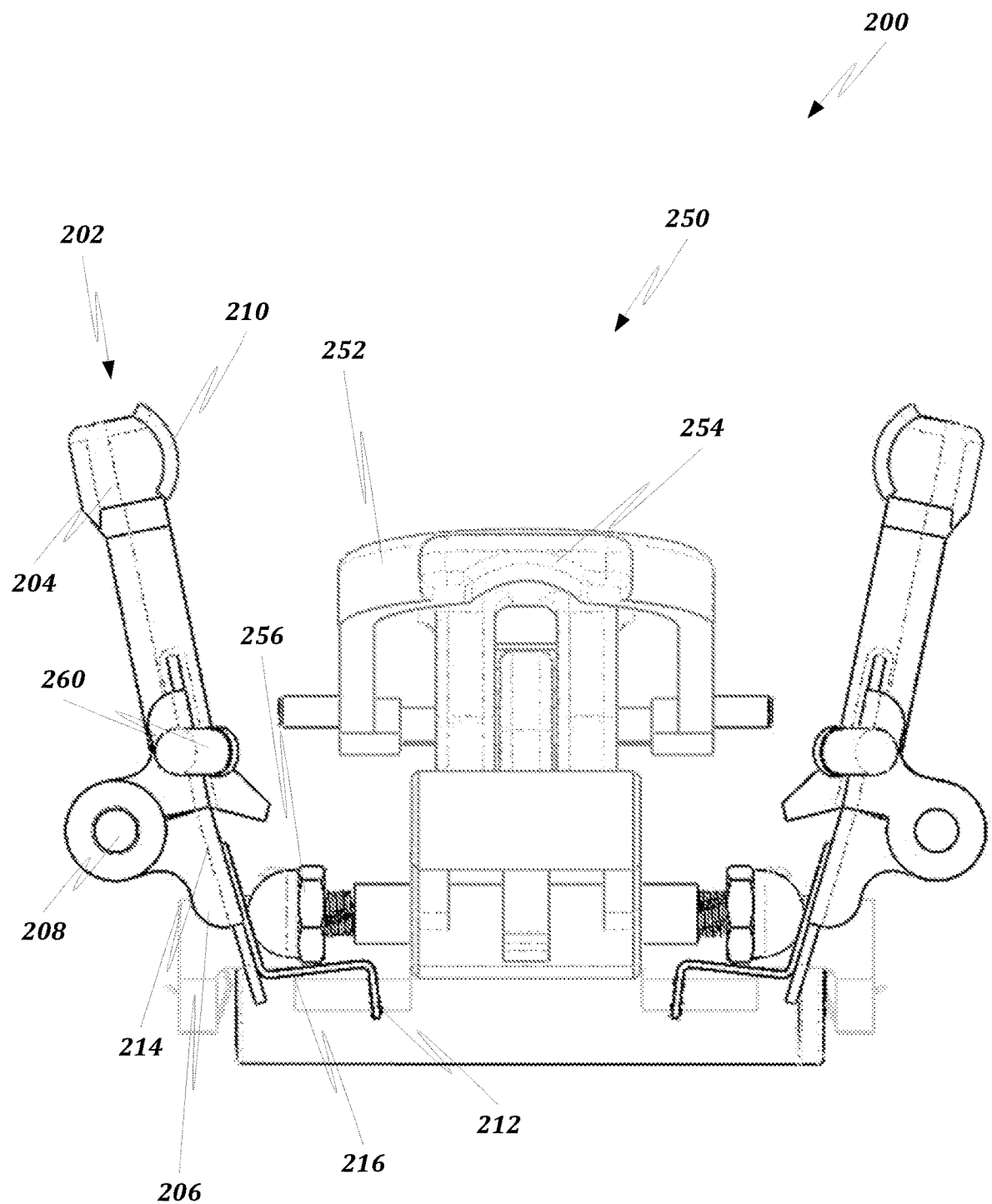
FIG. 4 shows the retaining mechanism of the footwear accessory of FIGS. 1 and 2, transitioning from an open position to a closed position.
Figure 5:
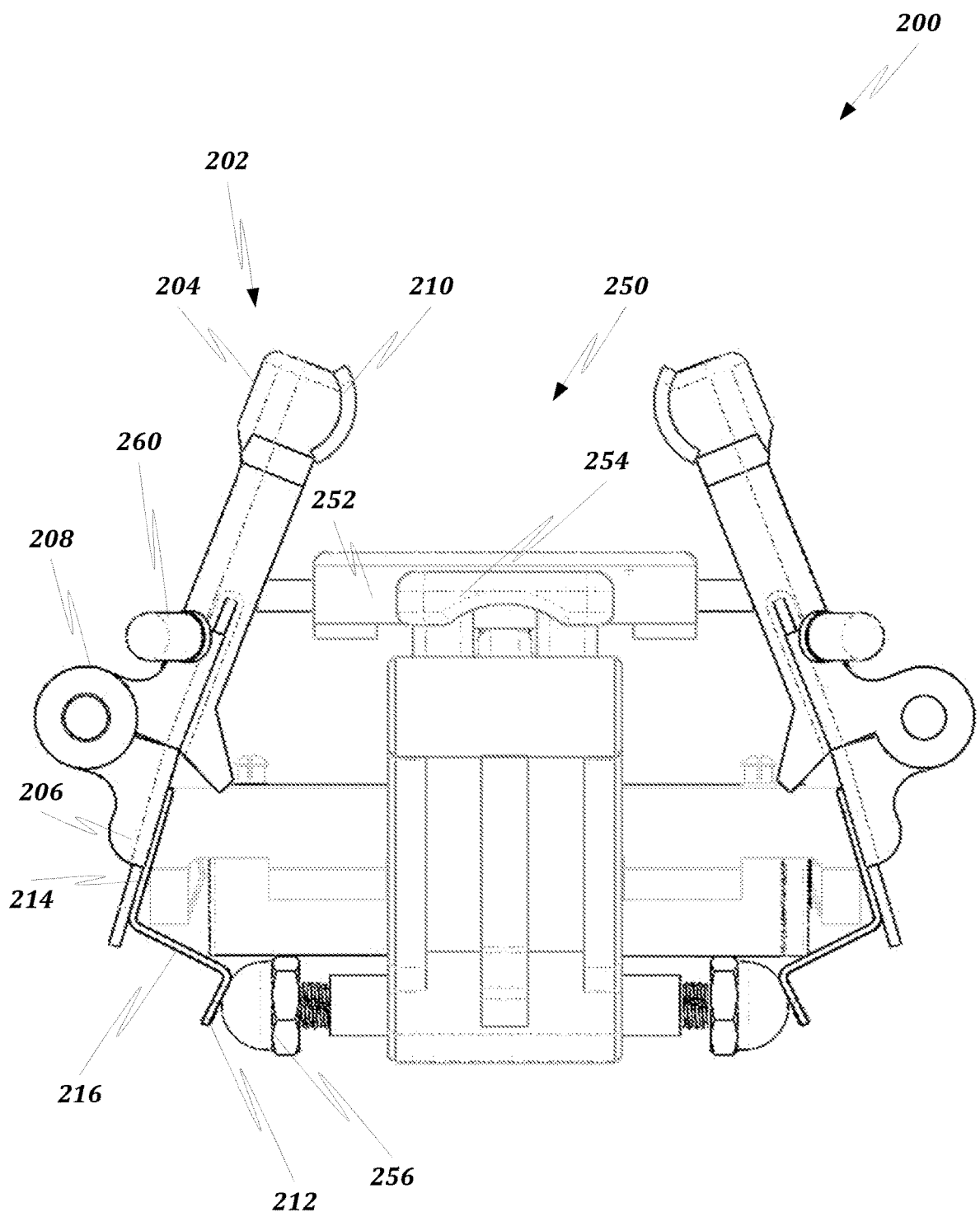
FIG. 5 shows the retaining mechanism of the footwear accessory of FIGS. 1 and 2, in a closed position.
Figure 6:
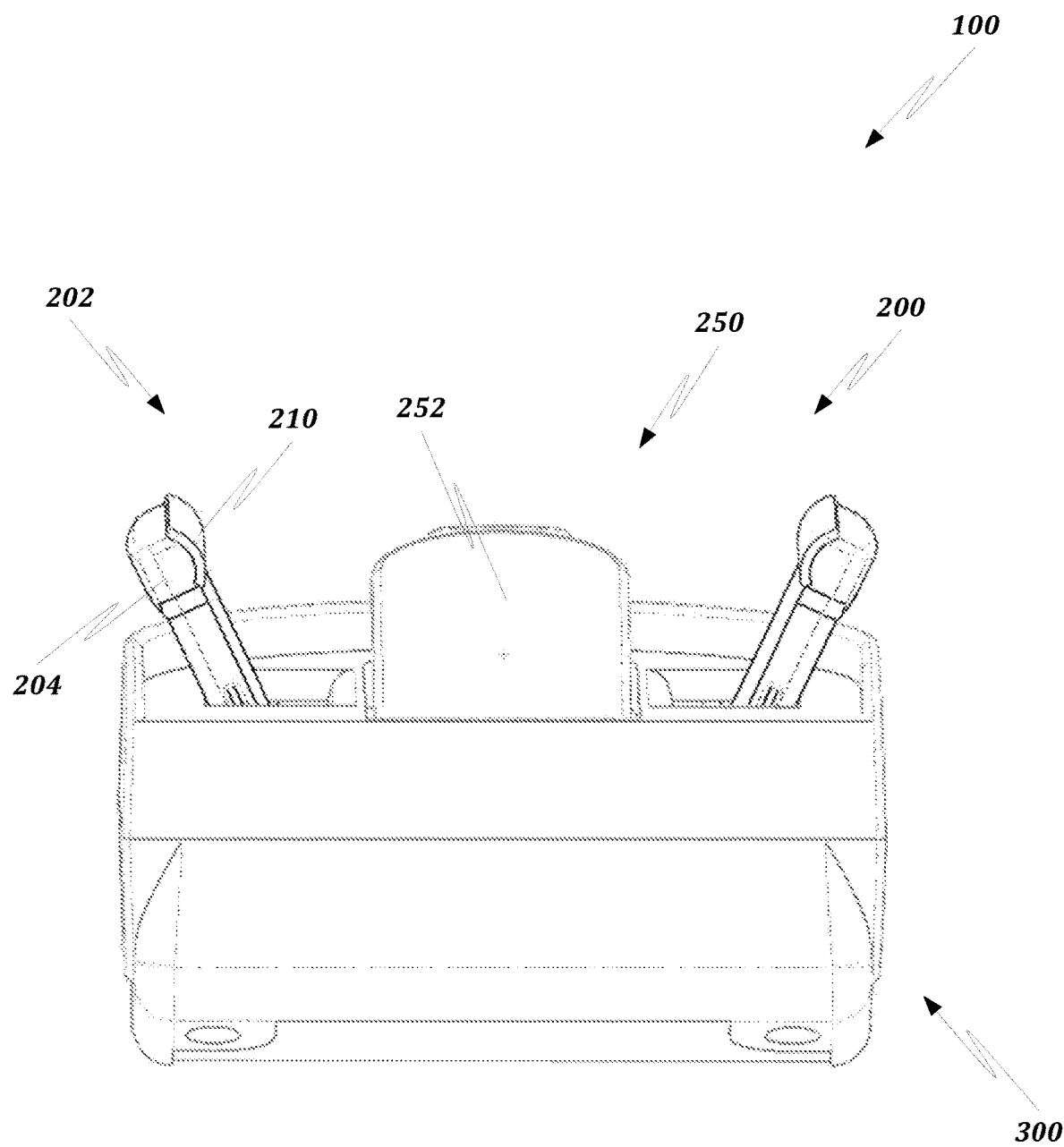
FIG. 6 is a front view of the removable footwear accessory, in an open position.
Figure 7:
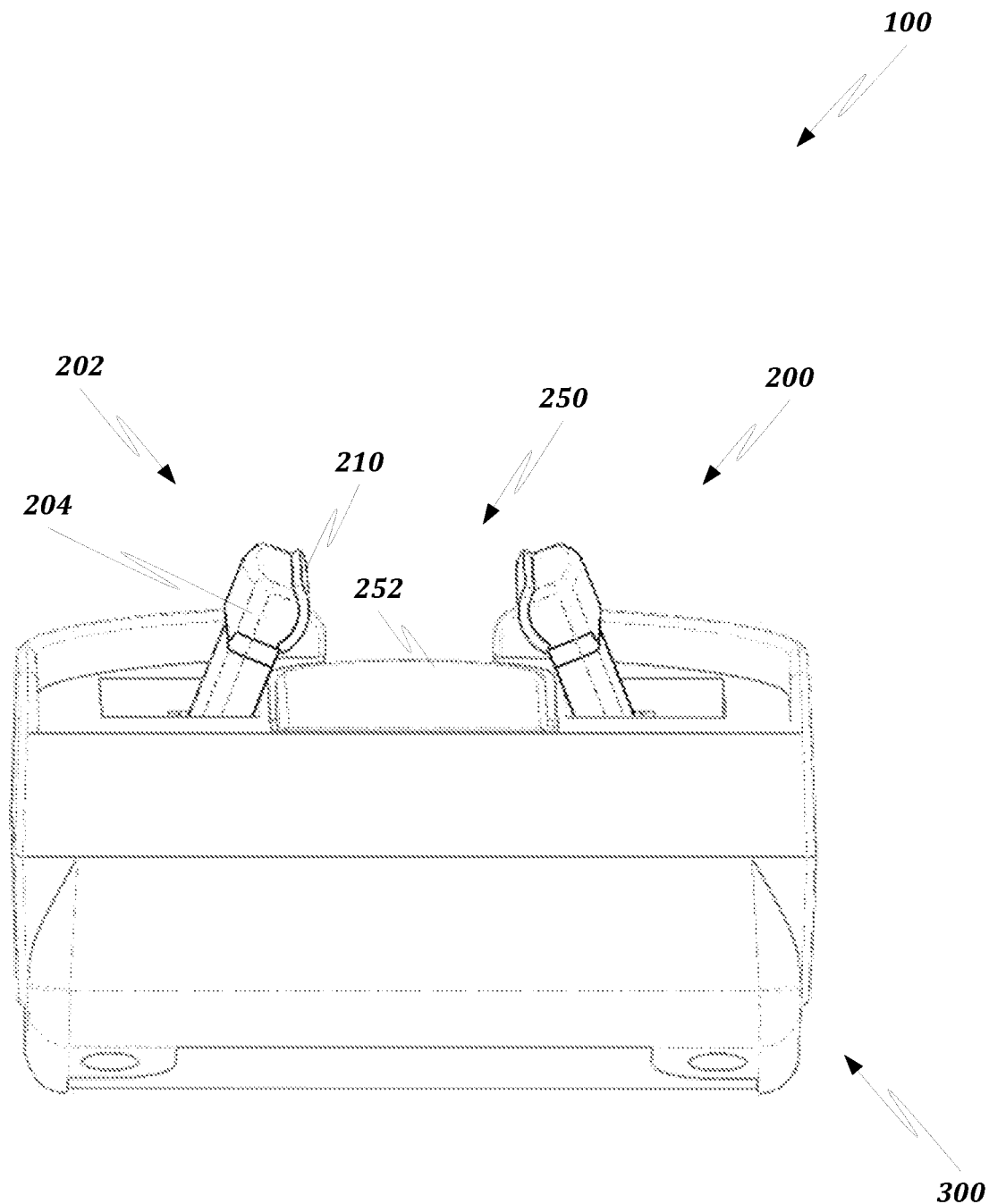
FIG. 7 is a front view of the removable footwear accessory, in a closed position.

FIGS. 3-5 illustrate an adjustable-width footwear retaining device 200 consistent with an embodiment of the disclosure for providing the removable footwear accessory 100. FIG. 3 illustrates the adjustable-width footwear retaining device 200 in an open position, FIG. 4 shows the adjustable-width footwear retaining device 200 transitioning from an open position to a closed position, and FIG. 5 illustrates the adjustable-width footwear retaining device 200 in a closed position.

As shown in FIGS. 3-5, the retaining device 200 comprises two opposing retaining arms 202, disposed on a medial side (e.g., towards the center of the user's body) and a lateral side (e.g., towards the outside of the user's body) of the accessory. Each retaining arm 202 may include an upper gripping portion 204 and a lower actuating portion 206, joined by a biasing hinge 208.

Each retaining arm 202 may include an upper gripping portion 204. The gripping portion 204 may be configured to interface with and releasably retain the footwear article. The gripping portion 204 may include an interfacing portion 210 configured to contact the footwear article. In embodiments, the interfacing portion 210 may be formed from a non-slip material that is designed to avoid scratching or marring the footwear with which it interfaces. As a non-limiting example, a rubber material may be used to form the interfacing portion 210. In embodiments, the gripping portion 204 may be formed as a substantially linear, elongate lever. The interfacing portion 210 may be disposed at a first end of the gripping portion 204, and the gripping portion may attach to the biasing hinge 208 at a second end, opposite the first end.

Each retaining arm may include an actuating portion 206. The actuating portion 206 may include a contact portion 212 configured to interface with an actuation mechanism 250, a hinge connecting portion 214 for connecting the actuating portion 206 to the biasing hinge 208, and a center portion 216 connecting the contact portion 212 and the hinge connecting portion 214. In embodiments, the contact portion 212 and the hinge connecting portion 214 may be a substantially planar, and may be offset from one another by the center portion 216. In embodiments, the actuating portion 206 may be biased towards the center of the retaining device 200, such that the retaining device 200 is biased to the open position, as shown in FIG. 2. The biasing may be from a spring or other force applying device in contact with the actuating portion.

In the biasing hinge 208 may connect the gripping portion 204 to the actuating portion 206. In embodiments, the biasing hinge 208 may be configured to allow the retaining arm 202 to rotate as a single unit about the hinge. The biasing hinge 208 may also allow the gripping portion 204 to rotate independently of the actuating portion 206. The biasing hinge may provide a biasing force urging the gripping portion inward, towards the center of the accessory.

In embodiments, the retaining device 200 comprises the actuation mechanism 250. The actuation mechanism 250 may include a closing interface element 252, an opening interface element 254, and a pair of contacting elements 256. The closing interface element 252 may comprise an interface such as, but not limited to, a lever or a button that interacts with an article of footwear. For example, the closing interface element 252 may be depressed by contacting the closing interface element. When the closing interface element is depressed, the closing interface element urges the contacting elements 256 downward, causing the retaining arms 202 to rotate so that the gripping portion 204 contacts the footwear article exerting the pressure on the closing interface element 252.

In embodiments, the contacting elements 256 may contact the contact portion 212 of the retaining arm 202. In embodiments, the contacting elements 256 may be rounded or substantially hemispherical to reduce friction between the contacting elements and the contact portion 212. Contacting elements 256 may, when in a fully closed (e.g., downward) position (as shown in FIG. 5), be retained by the contact portions 212, such that the contacting elements 256 may not move upward unless pulled up by the user (e.g., by pulling upward on the opening interface element 254). The user may apply an upward force to the opening interface element 254 by pulling upward with a finger. The upward force may overcome a biasing force of the contact portion 212 that retains the contacting elements 256.

Figure 8:
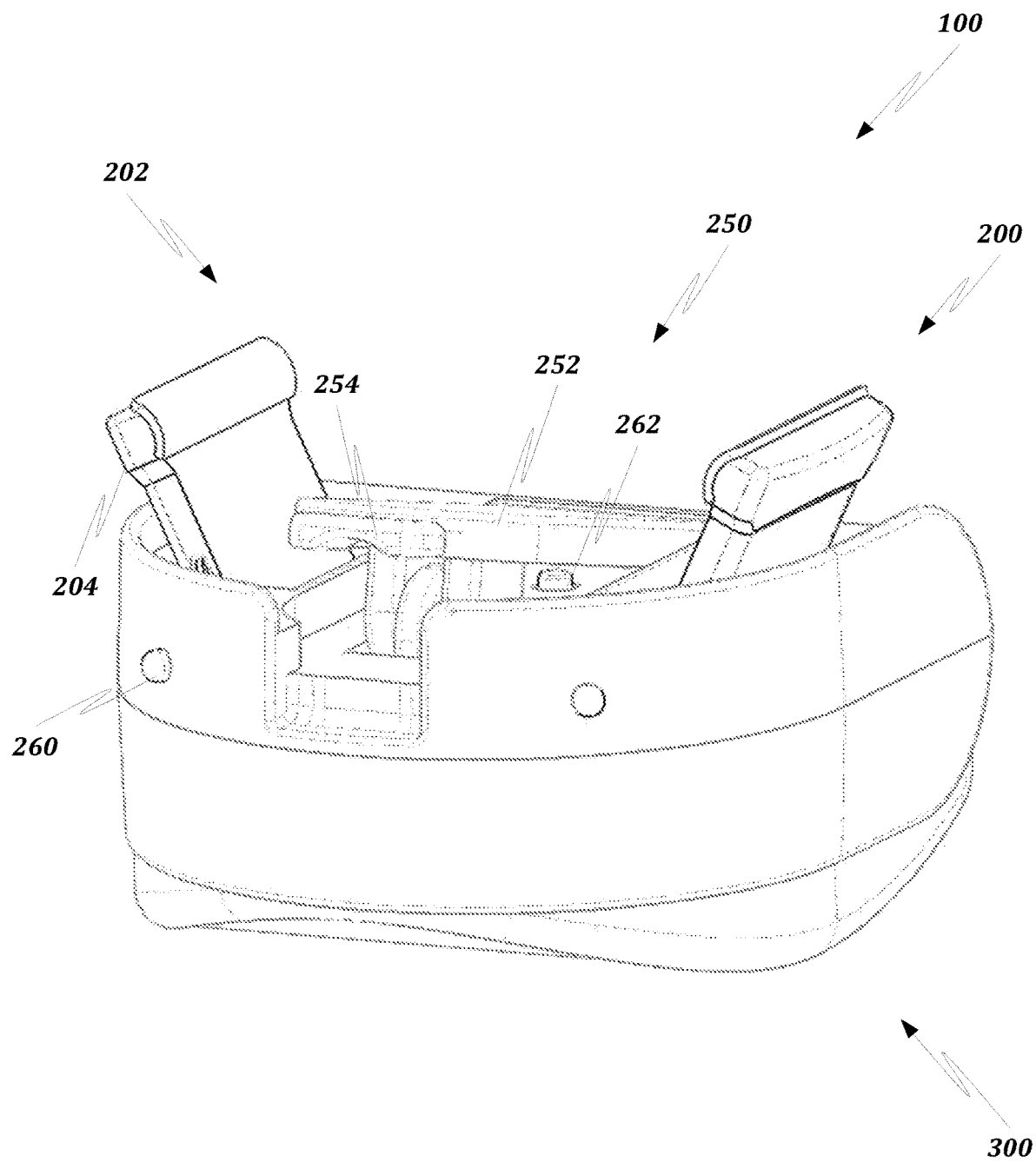
FIG. 8 is a rear perspective view of the removable footwear accessory, in an open position.
Figure 9:
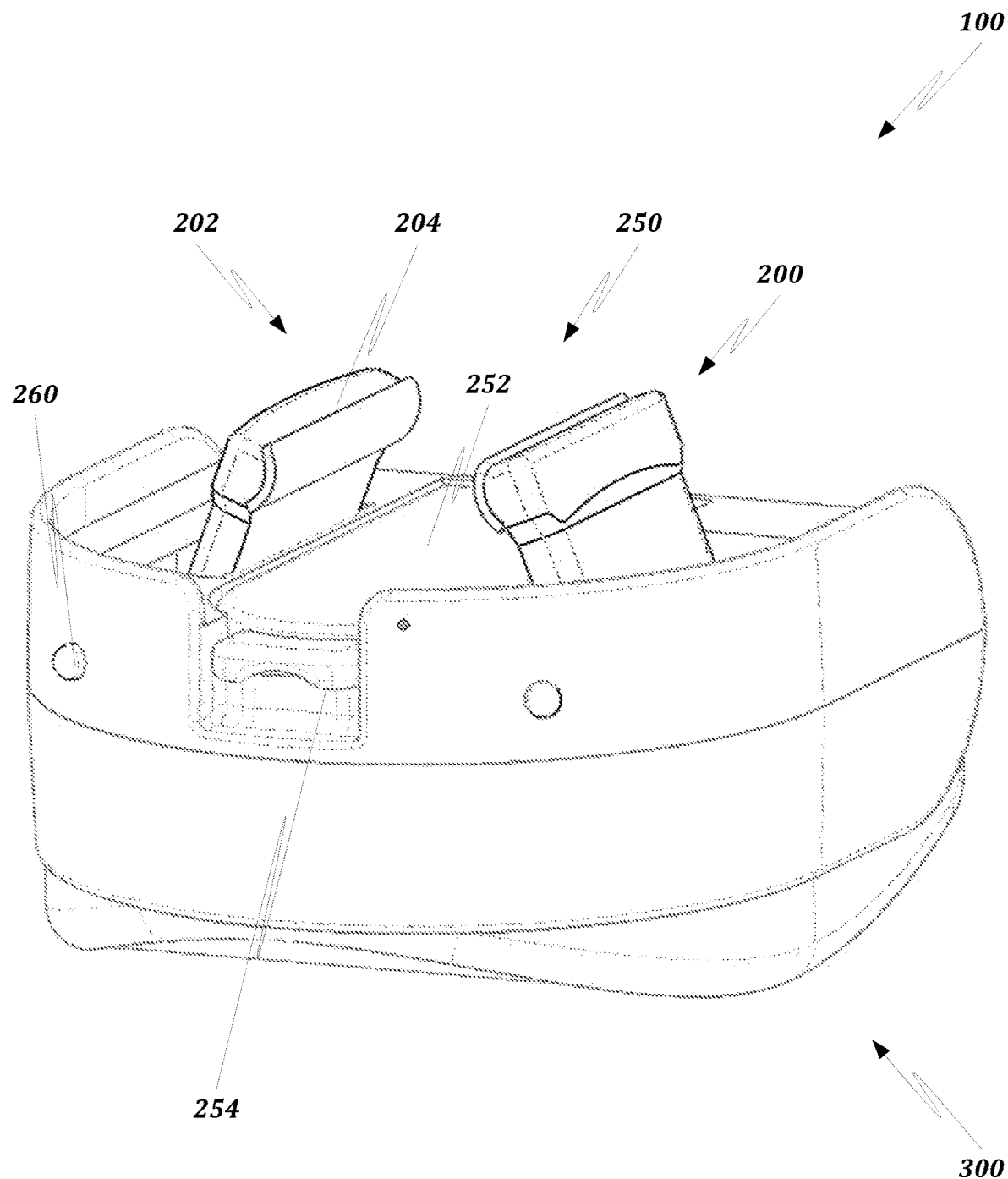
FIG. 9 is a rear perspective view of the removable footwear accessory, in a closed position.

In some embodiments, the retaining device 200 may include an indicator light 260. The indicator light 260 may be activated when the retaining device 200 is in the closed position. For example, as best shown in FIG. 8, the indicator light 260 may be actuated by a switch (e.g., a momentary switch) 262 that is depressed by the closing interface element 252. The indicator light 260 may be, for example, a light emitting diode (LED), an incandescent light bulb, an organic LED, or any other device configured to visually indicate that the retaining device 200 is in a locked state. In some embodiments, the LED may provide illumination sufficient for a user to see obstructions in the footwell, and to illuminate an actuator (e.g., the opening interface element 254) for releasing the retaining device 200. In some embodiments, the LED color may be selected to reduce eyestrain when working in a low light environment. For example, a red and/or amber LED may be used, because light in the red and amber wavelengths causes a reduced pupil dilation when compared to other colors of light. In some embodiments, the retaining device 200 may include a power source, such as a rechargeable or non-rechargeable battery having a power sufficient to energize at least the indicator light 260.

In some embodiments, the retaining device 200 may include a timer or other device connected to the power supply. The retaining device 200 may be configured to interface with an electronic device, such as a smartphone, tablet computer, personal computer, or other device. The timer may begin counting when the retaining device 200 enters a locked state. After a predetermined time period has elapsed, the retaining device 200 may cause the electronic device to provide an alert to the user, indicating that the user should consider taking a break from seated activities. For example, the alert may recommend standing, stretching, walking, or other physical activity that requires the user to stand.

B. The Support Base

FIGS. 6-10 illustrate a support base 300 consistent with an embodiment of the disclosure for providing the removable footwear accessory 100. The base 300 may include an outsole 302. In embodiments, the base 300 may have a height set such that a user's heel is at a level approximately equal to a bottom portion of a pedal in a commercial vehicle. As a non-limiting example, the base 300 may have a height of approximately 2-4 inches. However, those of skill in the art will recognize that the base 300 may have a height of less than 2 inches or more than 4 inches without departing from the scope of the invention. In embodiments, the base has a width set to provide stability while operating a vehicle. For example, the base 300 may be approximately 3-6 inches wide at a bottom portion, where the base contacts the floor. In some embodiments, the base 300 may be wider, to accommodate larger sizes of footwear. The base 300 may have a length selected to approximately match a length of the heel portion of a footwear article, while not covering the toe portion or the arch portion of the footwear article. In particular, the base may be approximately 3-4 inches long.

Figure 10:
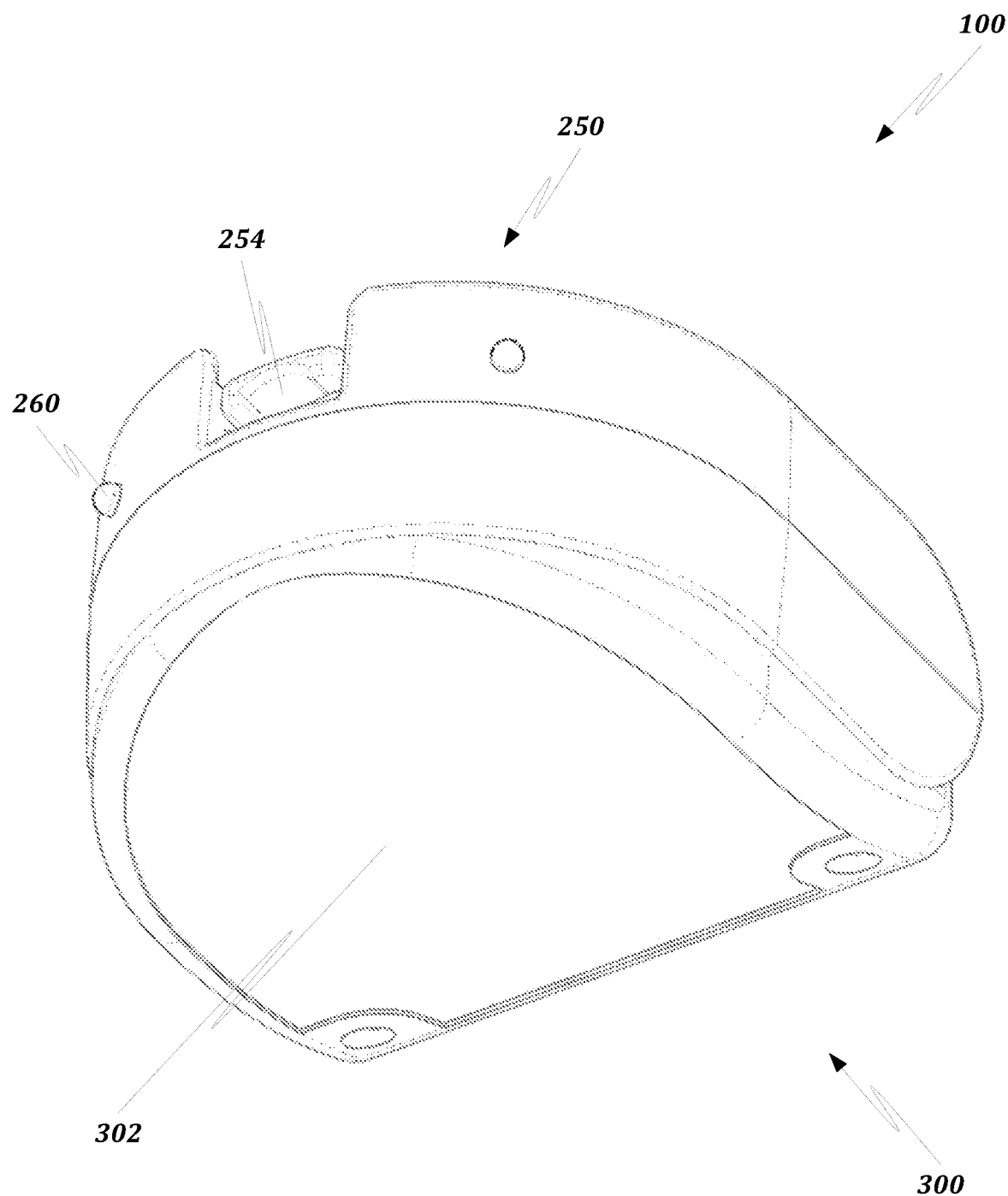
FIG. 10 is a bottom perspective view of the removable footwear accessory.

The base 300 is preferably formed at least partially from a non-skid material that can provide some cushion during extended periods of use. For example, the base 300 may include an outsole 302 formed from a rubber material. As a specific example, vulcanized rubber, such as that included in car tires, may be used to form the base 300 and/or the outsole 302. In particular, the base 300 and/or the outsole 302 may be formed from recycled car tires. In some embodiments, the outsole 302 may include a tread pattern. Alternatively, as shown in FIG. 10, the outsole 302 may be substantially smooth. In some embodiments, the base 300 may define a substantially flat plane. In other embodiments, the base 300 may define a fulcrum point or curve useful for depressing the pedals of a vehicle.

In some embodiments, the base 300 may be formed as a substantially solid unitary piece. In other embodiments, the base 300 may be formed as a hollow piece, and may include one or more support members at least partially embedded in the base. The support members may be formed from any relatively rigid and sturdy material. In some embodiments, relatively lightweight, natural materials such as wood are preferred. In other embodiments, various metals may be used.

In some embodiments, the base 300 may include one or more inserts at least partially embedded in the base. In some embodiments, the insert may be formed from materials such as copper or silver, that may provide some health benefit to a wearer. Alternatively or additionally, the inserts may be formed from a magnetic material. The magnetic material may provide circulatory and/or other health benefits to the user.

In embodiments, the base 300 may be formed so as to at least partially surround a portion of the retaining device 200. For example, the base 300 may surround at least the actuating portion 206 and the biasing hinge 208, but may leave the gripping portion 204 exposed. The base 300 may further leave the closing interface element 252, an opening interface element 254 exposed, such that the user may operate the retaining device 200.

In some embodiments the base 300 may optionally include one or more non-slip tacks embedded in a lower surface of the base. The one or more tacks may be disposed to provide additional traction by gripping a floor mat or carpeted surface of a vehicle floor to prevent slipping. In some embodiments, the one or more tacks may be positioned to allow for pivoting of the foot at the position of the tacks to depress the vehicle pedals.

III. Apparatus/System Use

To use the footwear accessory, a user in a seated position may position a heel portion of a footwear article in the footwear accessory. The user may press down with the heel to adjust the width of the accessory. Once the heel is fully depressed and flush against the base, the accessory is releasably locked onto the footwear article. The accessory may releasably retaining the footwear article via a friction fit.

While seated (e.g., during operation of a vehicle), the footwear accessory may releasably and removably retain the foot. In embodiments, a base of the footwear accessory may assist the user in rocking a foot to operate the vehicle pedals. The accessory may help to support the user's foot and ankle while seated.

To remove the accessory (e.g., upon completion of driving or when a user wishes to stand or walk), the user may trigger a release mechanism (e.g., by lifting up on the opening interface element 254), allowing the user to remove the accessory from the footwear article. In embodiments, the footwear accessory may not be configured to support a user's bodyweight and is removed prior to any standing or walking activity.

IV. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A removable footwear accessory device for supporting a foot and ankle of a user, the device comprising:
   a footwear retaining mechanism configured to releasably retain a heel portion of a footwear article, while not retaining an arch portion and a toe portion of the footwear article, wherein the footwear retaining mechanism includes a pair of opposing gripping arms and an actuation mechanism configured to cause the pair of opposing gripping arms to move from an open position to a closed position,
   each gripping arm comprising:
      a gripping portion configured to grip the footwear article,
      an actuating portion biased towards a center of the device and configured to rotate the pair of opposing gripping arms between the open position and the closed position, and
      a biasing hinge joining the gripping portion to the actuating portion such that the gripping portion is rotatable relative to the actuating portion, wherein the biasing hinge urges the gripping portion towards the center of the device;
   the actuation mechanism comprising:
      an operation lever configured to be depressed by a heel of a footwear article, and
      one or more force applying mechanisms connected to the operation lever such that the one or more force applying mechanisms move when the operation lever is depressed, the movement being configured to apply a force to the actuating portions of the pair of opposing gripping arms, wherein the force applied by the one or more force applying mechanisms causes the pair of opposing gripping arms to rotate from the open position to the closed position; and
   a support base configured to support the foot and ankle and to raise the foot to a position for operating a motor vehicle, wherein the footwear retaining mechanism is mounted to the support base.

2. The device of claim 1, wherein the support base has a height of approximately 2-4 inches, and a width of approximately 3-6 inches.

3. The device of claim 1, wherein the one or more force applying mechanisms are configured to be retained by the actuating portion while the pair of opposing gripping arms are in the closed position.

4. The device of claim 1, further comprising an indicator light configured to illuminate when the pair of opposing gripping arms is in the closed position, and to cease illumination when the pair of opposing gripping arms is in the open position.

5. The device of claim 1, wherein, as the pair of opposing gripping arms move from the open position to the closed position, the gripping portion is configured to contact the footwear article and to rotate about the biasing hinge relative to the actuating portion to maintain contact with the footwear article.

6. The device of claim 5, wherein the biasing hinge provides a gripping force to releasably retain the footwear article.

7. The device of claim 1, wherein the support base comprises a non-skid outsole.

8. The device of claim 1, wherein the support base at least partially surrounds the footwear retaining mechanism.

9. A footwear retaining device configured to releasably retain a heel portion of a footwear article, while not retaining an arch portion and a toe portion of the footwear article, the footwear retaining device comprising:
   a pair of opposing gripping arms, each gripping arm comprising:
      a gripping portion configured to grip the footwear article,
      an actuating portion biased towards a center of the device and configured to rotate the pair of opposing gripping arms between an open position and a closed position, and
      a biasing hinge joining the gripping portion to the actuating portion such that the gripping portion is rotatable relative to the actuating portion, wherein the biasing hinge urges the gripping portion towards the center of the device; and
   an actuation mechanism configured to cause the pair of opposing gripping arms to move from the open position to the closed position, the actuation mechanism comprising:
      an operation lever configured to be depressed by a heel of a footwear article, and one or more force applying mechanisms connected to the operation lever such that the one or more force applying mechanisms move when the operation lever is depressed, the movement being configured to apply a force to the actuating portions of the pair of opposing gripping arms, wherein the force applied by the one or more force applying mechanisms causes the pair of opposing gripping arms to rotate from the open position to the closed position;

wherein the footwear retaining device is configured to be mounted to a support base configured to support the foot and ankle and to raise the foot to a position for operating a motor vehicle.

10. The device of claim 9, wherein the one or more force applying mechanisms are configured to be retained by the actuating portion while the pair of opposing gripping arms are in the closed position.

11. The device of claim 9, further comprising an indicator light configured to illuminate when the pair of opposing gripping arms is in the closed position, and to cease illumination when the pair of opposing gripping arms is in the open position.

12. The device of claim 9, wherein as the pair of opposing gripping arms move from the open position to the closed position, the gripping portion is configured to contact the footwear article and to rotate about the biasing hinge relative to the actuating portion to maintain contact with the footwear article.

13. The device of claim 12, wherein the biasing hinge provides a gripping force to releasably retain the footwear article.

14. A removable footwear accessory device for supporting a foot and ankle of a user, the device comprising:
- a footwear retaining mechanism configured to releasably retain a heel portion of a footwear article, while not retaining an arch portion and a toe portion of the footwear article, wherein the footwear retaining mechanism includes:
  - a pair of opposing gripping arms, each gripping arm comprising:
    - a gripping portion configured to grip the footwear article,
    - an actuating portion configured to rotate the pair of opposing gripping arms between an open position and a closed position, and
    - a biasing hinge joining the gripping portion to the actuating portion such that the gripping portion is rotatable relative to the actuating portion, wherein the biasing hinge urges the gripping portion towards a center of the device; and
- an actuation mechanism configured to cause the pair of opposing gripping arms to move from the open position to the closed position, the actuation mechanism including:
  - an operation lever configured to be depressed by a heel of a footwear article, and
  - one or more force applying mechanisms connected to the operation lever such that the one or more force applying mechanisms move when the operation lever is depressed, the movement being configured to apply a force to the actuating portions of the pair of opposing gripping arms, wherein the force applied by the one or more force applying mechanisms causes the pair of opposing gripping arms to rotate from the open position to the closed position; and
- a support base configured to support the foot and ankle and to raise the foot to a position for operating a motor vehicle, wherein the footwear retaining mechanism is mounted to the support base.

15. The device of claim 14, wherein the one or more force applying mechanisms are configured to be retained by the actuating portion while the pair of opposing gripping arms are in the closed position.

16. The device of claim 14, further comprising an indicator light configured to illuminate when the pair of opposing gripping arms is in the closed position, and to cease illumination when the pair of opposing gripping arms is in the open position.

17. The device of claim 14, wherein, as the pair of opposing gripping arms move from the open position to the closed position, the gripping portion is configured to contact the footwear article and to rotate about the biasing hinge relative to the actuating portion to maintain contact with the footwear article.

18. The device of claim 17, wherein the biasing hinge provides a gripping force to releasably retain the footwear article.

19. The device of claim 14, wherein the support base comprises a non- skid outsole.

20. The device of claim 14, wherein the support base at least partially surrounds the footwear retaining mechanism.

* * * * *